May 31, 1949.　　　　D. P. DAVIS　　　　2,471,939
PUMPING MECHANISM
Filed Aug. 18, 1944　　　　2 Sheets-Sheet 1
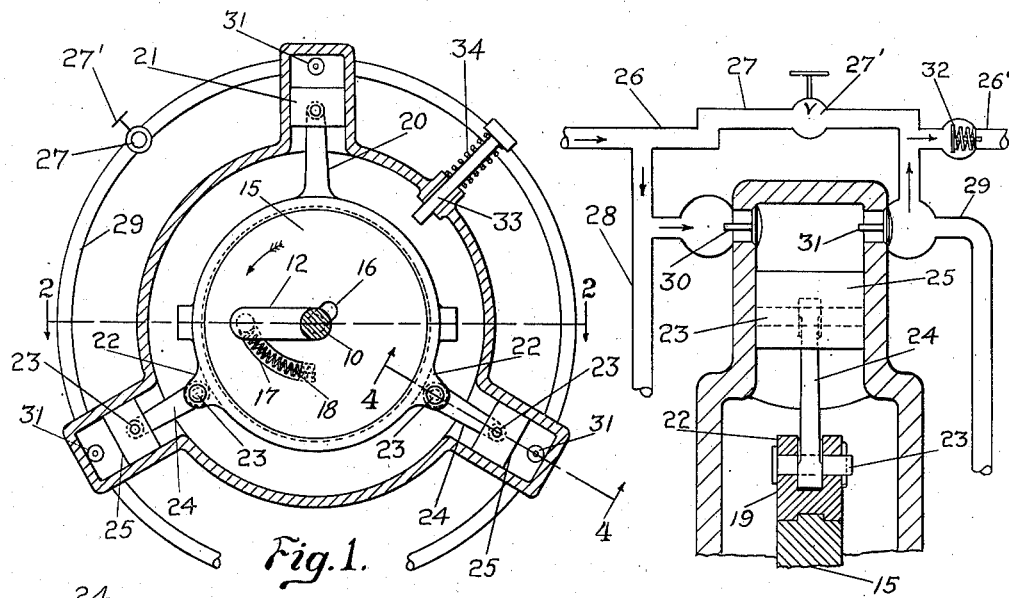
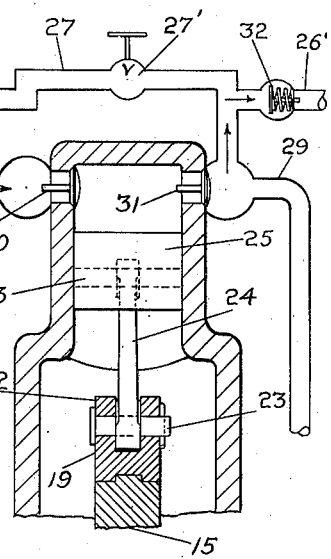
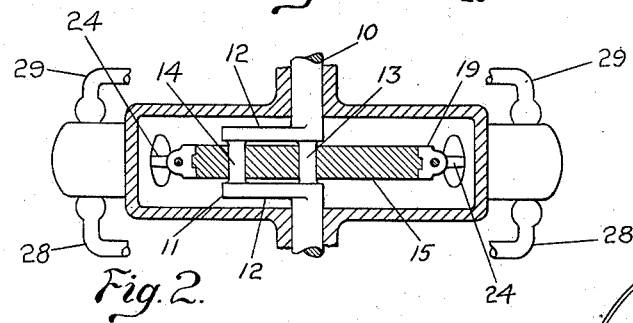
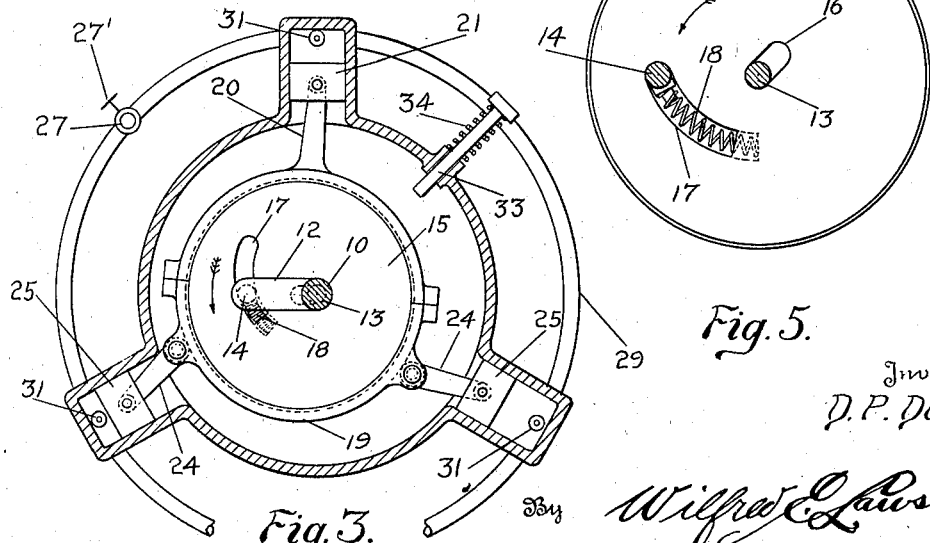
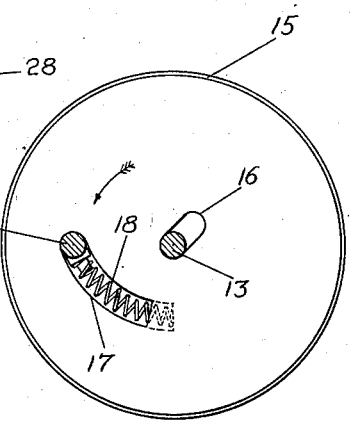
Inventor
D. P. Davis.
By Wilfred E. Lawson
Attorney Patented May 31, 1949

2,471,939

UNITED STATES PATENT OFFICE 2,471,939

PUMPING MECHANISM

Douglas P. Davis, Burbank, Calif.

Application August 18, 1944, Serial No. 550,050

14 Claims. (Cl. 103—174)

1

This invention relates generally to the class of pumps and pertains more particularly to improvements in pumps of the reciprocating piston type.

A principal object of the present invention is to provide an improved reciprocating piston type of pump in which the pistons are used or employed in multiple, and operatively coupled together by a novel driving connection wherein the arrangement is such that use may be made of a continuously rotating power shaft, the driving connection between the shaft and the piston coupling means being so designed that the pumps may be made to operate only at such times as they are required without varying the speed of rotation of the driving shaft.

Another and more specific object of the invention is to provide a pump mechanism employing a plurality of reciprocating pistons having a connecting rod assembly, including an annulus, operatively coupled therewith and an eccentric disk within the annulus and coupled in a novel manner with a driving crank shaft continuously rotating at constant speed whereby upon the shifting of the connecting rod assembly the disk, previously concentric with the shaft, will be shifted to an eccentric position with respect thereto to set up necessary eccentric rotation of the annulus and consequent actuation of the pump pistons connected therewith.

The invention will be best understood from a consideration of the following detailed description taken in association with the accompanying drawings forming a part of the specification with the understanding that changes may be made in the structure illustrated and described so long as such changes are within the scope of the appended claims.

In the drawings:

Figure 1 is a view in cross section of a pump, conventionally illustrated, constructed in accordance with the present invention.

Figure 2 is a section taken on the line 2—2 of Figure 1.

Figure 3 is a view similar to Figure 1 but showing the eccentric disk in eccentric or pumping position.

Figure 4 is a section through a cylinder illustrating, conventionally, pipe connections therewith, and control valves.

Figure 5 is a view illustrating the eccentric disk only with the crank pins connected therewith for the non-working rotation of the disk.

Figure 7:
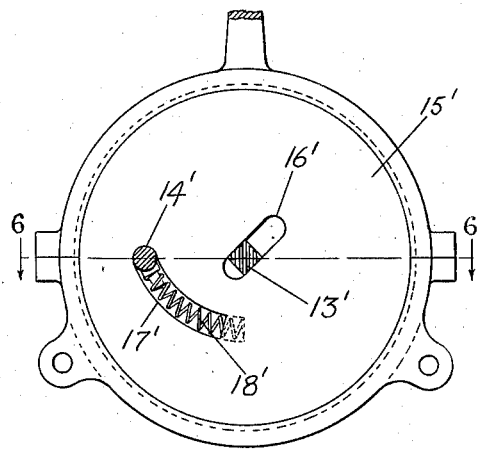

2 the disk and house being sectioned substantially on the line 6—6 of Figure 7.

Figure 6:
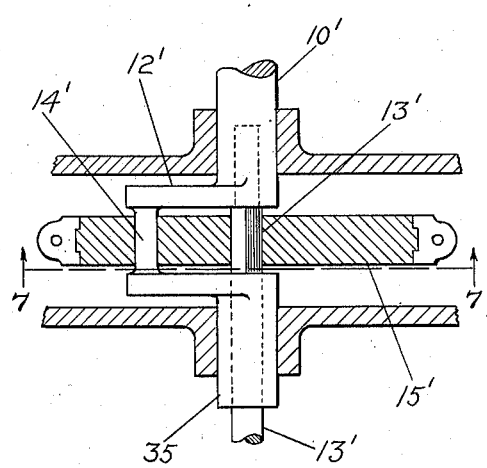
Figure 6 is a detail view illustrating another embodiment of the means for starting the pump.

Figure 7 is a section taken substantially on the line 7—7 of Figure 6.

Figure 8:
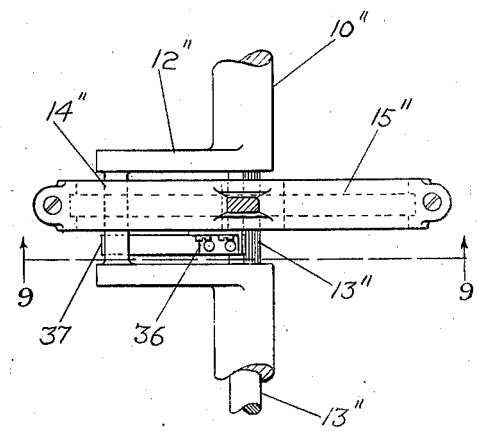

Figure 8 is a detail view illustrating another embodiment of the spring control for the disk.

Figure 9:
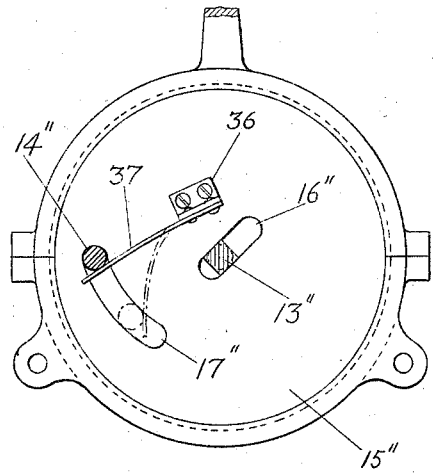

Figure 9 is a sectional view taken substantially on the line 9—9 of Figure 8.

Referring now more particularly to the drawings wherein the preferred embodiment of the invention is illustrated, the numeral 10 designates a power shaft having as an integral part thereof a crank 11 which comprises the two spaced parallel radial arms 12 which are connected at their inner and outer ends by the pins 13 and 14 respectively.

The pin 13 is concentric with the shaft and may form an integral part thereof.

The numeral 15 designates an eccentric disk which has therein, a straight slot 16, shown as having one end adjacent the center of the disk and extending radially.

Disposed outwardly from the inner end of the straight slot 16, by which is meant that end lying near the center of the disk, is a short arcuate slot 17 which is eccentric to the disk. The pin 13 is extended through the slot 16 while the outer pin 14 of the crank passes through the arcuate slot 17 and the distance between the crank pins is such that when the pin 13 is at the center of the disk 15 the other pin will be at the outer end of the slot 17, which is the end farthest from the center of the disk.

Within the slot 17 there is disposed a compression spring 18, which is interposed between the pin 14 and the inner end of the eccentric slot. This spring constantly urges movement of the pin 14 to the outer end of the eccentric slot and consequently effects the shifting of the center pin 13 to the center of the disk 15 so that the disk will normally turn concentric with the shaft.

Encircling the disk 15 is a connecting rod assembly consisting of an annular strap 19 and a number of radial arms connected to the outside thereof. One of these arms is relatively long as indicated at 20 and forms a piston rod for a pump 21 while the other arms are short as indicated at 22 and are pivotally connected by suitable wrist pins 23 with piston rods 24 of pumps 25. The pumps are equidistantly spaced around the eccentric strap as illustrated and while only three pumps are shown it is to be understood that any number, two or more, may be employed, if desired, spaced evenly around the crankshaft axis.

The numeral 26 designates a fluid pipe line leading to one side of the pump and for supplying fluid to the several cylinders thereof while the numeral 26' designates a lead-off pipe from which the fluid is conducted away from the pump cylinders or from the pumping mechanism as a whole. The several cylinders of the pumping mechanism may be supplied by the pipe 26 through a supply or intake manifold 28 while the lead-off pipe 26' may be similarly connected to an exhaust or outlet manifold 29.

The several cylinders of the pump are supplied from the intake manifold 28 through the inlet valve controlled ports 30 and similar outlet valve controlled ports 31 lead from the cylinders to the lead-off or exhaust manifold 29.

Connecting across between the feed or supply pipe 26 and the exhaust pipe 26' is a cross over pipe 27 in which is a shut-off valve 27'.

In addition to the shut-off valve 27' there is provided a flow control or restrictor valve 32 which is located in the lead-off pipe 26' and past which must flow the fluid pumped out through the exhaust manifold.

The operation of the pumping mechanism described is as follows:

It is obvious that if the disk 15 is turned about its axial center as indicated in Figure 1, with the outer crank pin 14 at its farthest position from the disk center and the inner pin 13 at the center of the disk, the disk will turn freely within the annulus of the connecting rod assembly and no motion would be transmitted to the piston rods and the pistons connected therewith. This would be the idling phase of the pump mechanism operation.

To get the pump started so as to effect the movement of the fluid through the pipe line connected with each pump cylinder, the valve 27' would first be closed. A force would then be applied to a piston or the connecting rod assembly in a line radial to the line of rotation to tend to push the piston assembly off center. The force would be sufficient to cause the spring in the slot 17 to be compressed so as to move the disk across the rotary axis of the shaft and with relation to the two crank pins when the disk rotates to the proper position. This relative motion moves the center of the disk away from the axis of rotation and causes the periphery of the disk to turn eccentrically about the axis of rotation of the shaft. Such eccentric motion of the disk causes a corresponding eccentric movement or rotation of the annulus or the connecting rod assembly and effects the desired reciprocation of the piston rods.

The disk will remain in an eccentric position with respect to the crank shaft as long as the spring in the slot remains compressed. This condition will prevail as long as there is resistance to motion of the pistons, as in pumping against a pressure head.

As previously stated the restrictor valve 32 is provided to assure a definite minimum pressure against the discharge of the pump.

To explain more specifically the manner of putting the pump into pumping operation take for an instantaneous example the case where the members are in the positions shown in Figure 1 when the disk and shaft are rotating. The crank shaft is supported in bearings and therefore cannot be moved by any radial force. Under these conditions, if a force were applied to the upper piston 21, there could be no lateral or downward movement of the disk because the left hand pin, the crank pin 14, is at the outer end of the eccentric slit 17. If it be supposed that a force were applied toward the center of rotation on the piston at the lower left of the figure mentioned, there still would be no motion of the disk, because the crank pins 13 and 14 are at the ends of their respective slots and will not let the disk be moved. If, now, it be supposed that a force is applied to the lower right piston, such force would displace the disk by compressing the spring as the disk could be shifted, together with the annulus and the connecting rods attached thereto, into the position in which it is shown in Figure 3. The disk would then automatically be given eccentric motion and such eccentric motion would be imparted to the whole assembly.

As previously stated the first operation in starting the pump is to shut the communicating valve 27' between the pipes 26 and 26'. Thus the flow of liquid between the pipes 26 and 26' is shut off and such liquid must pass from the pipe 26 into the intake manifold 28 to supply the pump cylinders. When this is done, any eccentric motion of the piston assembly starts the pumping action and hence offers resistance to the rotational movement of the crankshaft. Any resistance of this kind keeps the spring compressed and hence keeps the disk in its eccentric position.

In the above instantaneous example, the description of the application of force to first one and then the other of the pistons has assumed the disk to be motionless although it is one of the novel features of the present mechanism that the disk turns constantly. To proceed further, if a force is applied to any of the pistons or to the rod or disk in any manner whatsoever, as long as it is a radial force, as the disk turns about its center of rotation, it will reach a position in each revolution where the force can move the disk and whole assembly into the eccentric position as previously explained in connection with the above reference to Figure 3. Once the assembly has been moved into this position slightly, the pumping load will offer sufficient force to completely compress the spring.

The manner of applying the load or force is not critical. It could be applied by introducing fluid into one pump cylinder under sufficient pressure or it could be applied by some mechanical means.

As an illustration of one mechanical means of applying the desired force to the connecting rod assembly there is shown a plunger rod 33 mounted for reciprocal movement through the wall of the pump crankcase. This plunger is free to be pushed in against the annulus of of the connecting rod assembly, by hand or any other means desired.

A spring 34 encircles the plunger 33 between the head thereof and the wall of the crankcase and holds the plunger out away from the annulus except at the time of applying force to the latter.

Figures 6 and 7 illustrate another means for effecting the starting of the pump or for effecting the desired eccentric movement of the disk to start the pump operating.

In this arrangement the shaft is designated 10' and at one side the crank is of tubular form as indicated at 35. Extending through this tubular portion 35 of the crankshaft is the pin 13' which is unconnected with the shaft and, at its inner end is of square or rectangular cross section, instead of being round as in the portion which passes through the tubular part 35 of the crankshaft. This rectangular or squared portion of the pin engages in the slot 16' of the disk 15'.

If, during the time that the pump is idling, the disk 15' turning concentrically with the shaft, a braking action be applied to the outer end of the pin 13' it will be seen that a restraining action will be applied to the disk which will cause the spring 18' to be compressed by the relative motion of the crank 12' and the pin 14' thus causing the disk to be moved to the eccentric position.

Figures 8 and 9 illustrate a slight modification of the spring connection between the disk and the outer crankpin of the crankshaft. In this construction the rotary disk is designated 15" while the shaft is designated 10" and the crank and outer crankpin designated respectively 12" and 14".

The shaft is here illustrated as having one side tubular to receive the crankshaft pin 13", the inner end of which is squared as illustrated in connection with the pin 13'.

Attached to one side face of the disk 15" by means of the rigid connection 36, is a leaf spring 37 which extends outwardly across the arcuate slot 17", the normal or unflexed position of the free outer end being adjacent to the outer end of the arcuate slot. Between the outer end of the arcuate slot and the free outer end of the leaf spring 37, the crankpin 14" is located during the period of idling operation of the pump or, in other words, when the disk is turning concentrically with the crankshaft.

It is believed to be readily obvious that the operation of the pump using the leaf type spring 37 would be the same as in using the coil type spring 18 shown in Figures 1, 3 and 5, therefore, a detailed description of the operation of the machine using this specific form of spring is believed to be unnecessary.

When it is desired to stop the pump, the valve 27' is opened. This connects the inlet of the pump to the outlet and eliminates back pressure against the discharge. This action eliminates the eccentric force previously applied against the connecting rod assembly, which lets the spring in the slot move the disk back to the position shown in Figure 5, where the periphery of the disk rotates concentrically about the axis of rotation of the crankshaft.

I claim:

1. A pumping structure comprising a pump including a piston, a disk having a slot extending from adjacent the disk center and an eccentric arcuate slot, a shaft, a crank carried by the shaft and having two pins each passing through a slot, one pin being concentric with the shaft and passing through the first slot, the pins being so spaced that when the said one pin is in the center of the disk the other pin is in the outer end of the arcuate slot, an annulus on and encircling the disk, and a driving coupling between the annulus and the piston.

2. A pumping structure as set forth in claim 1, including a valve controlled inlet for the pump, a valve controlled outlet for the pump, and a valved coupling between the inlet and outlet and by-passing the pump.

3. A pumping structure, comprising a shaft, a disk disposed in a plane perpendicular to the shaft, a member concentric with the shaft and connected with the disk for movement relative to the disk from the center of the disk a predetermined distance radially, a second member carried by and eccentric to the shaft and having eccentric connection with the disk and movable relative to the disk in an arcuate path eccentric thereto and directed across the path of movement of the first member, said members forming a driving connection between the shaft and the disk whereby the disk may be selectively rotated concentric with the shaft or eccentric thereto, resilient means normally urging movement of the disk relative to the shaft to a position where the disk will be rotated concentric with the shaft, pump units arranged around the periphery of the disk and each including a cylinder having an intake and outlet and a piston, an annulus carried by and encircling the disk and in which the disk turns, a driving connection between the pistons and the annulus, means for shifting the disk to said eccentric position against the resistance of said resilient means, and means for maintaining the disk in said eccentric position.

4. A pumping structure as set forth in claim 3, in which said members are in the form of crankpins and in which the connections between the members and the disk comprise slots in which the pins slidably engage.

5. A pumping structure as set forth in claim 3, in which the members connecting the shaft with the disk are in the form of crankpins and in which the connections between the members and the disk comprise slots in which the pins slidably engage; and said resilient means comprises a coil spring lying in the slot in which the second mentioned pin member moves.

6. A pumping structure as set forth in claim 3, in which the members connecting the shaft with the disk are in the form of crankpins and in which the connections between the members and the disk comprise slots in which the pins slidably engage; and said resilient means comprises a leaf spring secured at one end to the disk and having a free end extending across the slot in which the second mentioned pin member slidably moves.

7. A pumping structure as set forth in claim 3, in which the said means for shifting the disk to the eccentric position comprises a pin supported for movement against the periphery of the annulus for applying radial pressure against the disk.

8. A pumping structure as set forth in claim 3, in which the said means for shifting the disk to the eccentric position includes the first mentioned member which is so constructed and arranged that a braking force may be applied to the disk to retard the rotation thereof.

9. A pumping structure as set forth in claim 3, with a valved passage connecting the intake and outlet of the cylinder, and a flow restrictor valve connected with the cylinder outlet for imposing a back pressure upon fluid flowing therefrom.

10. A pumping structure comprising a pump including a piston, a disk, a shaft connected with the disk to rotate the same, means for shifting the disk transversely of the shaft between positions concentric with and eccentric to the shaft, and an operative driving connection between the disk and the piston, the connection between the disk and shaft comprising a crank having a pin concentric with the shaft and a pin eccentric with the shaft, the pins passing through the disk.

11. A pumping structure, comprising a shiftably supported continuously rotating circular member, at least two piston cylinders equidistantly spaced around the periphery of the member, pistons in the cylinders, a valve controlled inlet and a valve controlled outlet for each cylinder, means forming a driving connection between the periphery of the member and the pistons which is so constructed and arranged that the member when shifted to one position rotates in the center of the space between the cylinders without driving the pistons and when shifted to another position rotates eccentrically in said space to drive the pistons, means for maintaining the member in said eccentric position, means in circuit with the outlet for maintaining a back pressure against fluid leaving the cylinder, and the penultimate means being designed to be maintained operative by reason of such back pressure.

12. A pumping structure comprising a shaft, a disk disposed across the shaft, a continuous driving connection between the shaft and disk which is so constructed and arranged that the disk may be shifted from a position concentric with the shaft to a position eccentric thereto, pump units arranged around the periphery of the disk and each including a cylinder having an intake and an outlet and a piston, an annulus carried by and encircling the disk and in which the disk turns, a driving connection between the pistons and the annulus, means for shifting the disk to the eccentric position, and means for maintaining the disk in said eccentric position, said last means comprising a valved by-pass connection between said cylinder inlet and outlet.

13. A pumping structure comprising a pump including a piston, a disk, a shaft connected with the disk to rotate the same, means for shifting the disk transversely of the shaft between positions concentric with and eccentric to the shaft, and an operative driving connection between the disk and the piston, the said driving connection being at the periphery of the disk.

14. A pumping structure, comprising a shiftably supported continuously rotating circular member, at least two piston cylinders equidistantly spaced around the periphery of the member, pistons in the cylinders, means forming a driving connection between the periphery of the member and the pistons which is so constructed and arranged that the member when shifted to one position rotates in the center of the space between the cylinders without driving the pistons and when shifted to another position rotates eccentrically in said space to drive the pistons, means for effecting the shifting of the circular member from concentric to eccentric position during rotation of the member, means for maintaining the member in said eccentric position, the said last means being kept effective so long as resistance is maintained to the movement of the pistons inwardly in their respective cylinders, and means for effecting the shifting of the circular member back to the said one position where it rotates in the center of the space between the cylinders without driving the pistons when the said resistance to the movement of the pistons into their respective cylinders is removed.

DOUGLAS P. DAVIS.

REFERENCES CITED

The following references are of record in the file of this patent:

UNITED STATES PATENTS

| Number | Name | Date |
| --- | --- | --- |
| 1,040,057 | Tokheim | Oct. 1, 1912 |
| 1,149,728 | Ciarlo | Aug. 10, 1915 |
| 1,477,300 | Thrift | Dec. 11, 1923 |
| 1,630,168 | Caut | May 24, 1927 |
| 1,633,720 | Wilsey | June 28, 1927 |
| 1,982,958 | Kraus | Dec. 4, 1934 |
| 2,203,646 | Aspden | June 4, 1940 |
| 2,268,695 | Carlson | Jan. 6, 1942 |
| 2,406,115 | Stephan | Aug. 20, 1946 |